United States Patent [19]

Jackson

[11] 4,025,443

[45] May 24, 1977

[54] CLAY-FREE WELLBORE FLUID

[76] Inventor: Jack M. Jackson, P.O. Box 35221, Houston, Tex. 77035

[22] Filed: Mar. 17, 1975

[21] Appl. No.: 558,817

[52] U.S. Cl. .......................... 252/8.5 A; 252/8.5 C; 252/8.55 R
[51] Int. Cl.² .......................................... C09K 7/02
[58] Field of Search .......... 252/8.5 A, 8.5 B, 8.5 C, 252/8.55 R

[56] References Cited

UNITED STATES PATENTS

| 3,319,715 | 5/1967 | Parks | 252/8.5 X |
|---|---|---|---|
| 3,483,121 | 12/1969 | Jordan | 166/308 X |
| 3,723,408 | 3/1973 | Nordgren et al. | 252/8.55 X |
| 3,878,110 | 4/1975 | Miller et al. | 252/8.5 |

FOREIGN PATENTS OR APPLICATIONS 771,110  3/1957  United Kingdom ................ 252/8.5

OTHER PUBLICATIONS

Rogers, Composition and Properties of Oil Well Drilling Fluids, Third Edition, 1963, pp. 417 and 418.

*Primary Examiner*—Herbert B. Guynn
*Attorney, Agent, or Firm*—Kenneth H. Johnson

[57] ABSTRACT

A clay-free, i.e., non-argillaceous wellbore fluid, having unstructured viscosity is obtained by combining water with an additive composition comprising hydroxy alkyl guar gum and at least 10 weight percent of magnesia or magnesium hydroxide based on the weight of hydroxy alkyl guar gum.

15 Claims, No Drawings

CLAY-FREE WELLBORE FLUID

BACKGROUND OF THE INVENTION

The present invention lies in the field of additives to wellbore fluids used while drilling weels in earth formations, completion operations after the drilling has been completed, workover, fracturing, and various other operations in a wellbore, that is, all of those fluids which are employed over the course of the life of a well.

Particularly, the invention is concerned with stablized additives to non-clay wellbore fluids such as pure water, various brines and emulsions of water and oil, more particularly the invention relates to additive compositions for use in wellbore fluids and to wellfore fluid containing these additive compositions.

Generally wellbore fluids will be either clay-based or brines which are clay-free. Fresh water system are sometimes used, but the brines have certain advantages which are discussed below. These two classes are exclusive, that is, clay-based drilling fluids are not brines. A wellbore fluid can perform any one or more of a number of functions. For example, the drilling fluid will generally provide a cooling medium for the rotary bit and a means to carry off the drilled particles. Since great volumes of drilling fluid are required for these two purposes, the fluids have been based on water. Water alone, however, does not have the capacity to carry the drilled particles from the borehole to the surface.

In the drilling fluid class, clay-based fluids have for years preempted the field, because of the traditional and widely held theory in the field that the viscosity suitable for creating a particle carrying capacity in the drilling fluid could be achieved only with a drilling fluid having thixotropic properties, that is, the viscosity must be supplied by a material that will have sufficient gel strength to prevent the drilled particles from separating from the drilling fluid when agitation of the drilling fluid has ceased, for example, in a holding tank at the surface.

In order to obtain the requisite thixotropy or gel strength, hydratable clay or colloidal clay bodies such as bentonite or fuller's earth have been employed. As a result the drilling fluids are usually referred to as "muds". In other areas where particle carrying capacity may not be as critical, such as completion or workover, bine wellbore fluids are extensively employed. The use of clay-based drilling muds has provided the means of meeting the two basic requirements of drilling fluids, i.e., cooling and particle removal. However, the claybased drilling muds have created problems for which solutions are needed. For example, since the clays must be hydrated in order to function, it is not possible to employ hydration inhibitors, such as calcium chloride, or if employed, their presence must be at a level which will not interfere with the clay hydration. In certain types of shales generally found in the Gulf Coast area of Texas and Louisiana, there is a tendency for the shale to disintegrate by swelling or cracking upon contact with the water, if hydration is not limited. Thus the uninhibited clay-based or fresh water drilling fluids may be prone to shale disintegration.

The drilled particles and any heaving shale material will be hydrated and taken up by the conventional clay-based drilling fluids. The continued addition of extraneous hydrated solid particles to the drilling fluid will increase the viscosity and necessitated costly and constant thinning and reformulation of the drilling mud to maintain its original properties.

Another serious disadvantage of the clay-based fluids is their susceptibility to detrimental effect of brines which are often found in drilled formations, particularly Gulf Coast formations. Such brine can have a hydration inhibiting effect, detrimental to the hydration requirement for the clays.

A third serious disadvantage of clay-based drilling fluids arises out of the thixotropic nature of the fluid. The separation of drilled particles is inhibited by the gel strength of the drilling mud. Settling of the drilled particles can require rather long periods of time and require settling ponds of large size.

Other disadvantages of clay-based drilling fluids are their (1) tendency to prevent the escape of gas bubbles, when the viscosity of the mud raises too high by the incidental addition of hydratable material, which can result in blowouts; (2) the need for constant human control and supervision of the clay-based fluids because of the expectable, yet unpredictable, variations in properties; and (3) the formation of a thick cake on the internal surfaces of the wellbore.

Fresh water wellbore fluids avoid many of the clay-based fluid problems, but may cause hydration of the formation. The brines have the advantage of containing hydration inhibiting materials such as potassium chloride, calcium chloride or the like. Quite apparently any solid particulate material would be easily separated from the brine solution since it is not hydrated. Thus, the properties of the brine are not changed by solid particulate matter from the wellbore. Similarly, since there is no opportunity for gas bubbles to become entrapped, blowouts are less likely in a clay-free brine-type wellbore fluid.

Thus, the wellbore art now has two competing and incompatible water based systems which can be used in a full range of wellbore operations, i.e., the problem plagued clay-based wellbore fluids or the improved clay-free wellbore fluids, principally brines. In many areas of application, as noted above, clay-free brines are already the usual selection.

Quite frequently water loss control agents have been used in wellbore fluids, such as starch, other natural gums, e.g., guar, karaya, psyllium, tragacanth, talha, locust bean, ghatti and the like, cellulosic derivatives, such as carboxymethyl cellulose, carboxymethyl, hydroxyethyl cellulose, synthetic polymers such as polyacrylic acid, polyethylene glycol etc. However, the stability of these materials has been a continuing problem, which usually means early and frequent make up of the water loss control material in wellbore operations.

When a non-clay wellbore fluid is used for a purpose requiring relatively high viscosity, for example drilling, it is generally necessary to employ an additive to thicken the fluid to the point where it will have the necessary carrying capacity. Several additives to increase viscosity are commercially available, but most if not all of these have one or more limitations. The viscosifier may be slow to yield, i.e., it may take 15 minutes or more from the time of addition to the time when the fluid becomes thick enough to carry the cuttings. The additives may be effective over only a narrow low temperature range, permitting the fluid to thin out again a higher temperature is reached. In addition, most of the viscosifiers have a limited service life, again thinning out after a period of use.

Many of the water loss additives have been found to be suited for providing non-structured viscosity to non-clay wellboae fluids. Hydroxyalkalated guar gum can provide non-structured, i.e., non-thixotropic viscosity to wellbore fluids. These materials are water soluble and non-ionic, thus they are not susceptible to being expelled from a brine solution, for example as are the soluble salts of carboxymethyl cellulose. The term "non-structured viscosity" as used here means one wherein viscosity is obtained by physio-chemical rather than by physical means. Asbestos and attapulgite are examples of the types of materials employed to obtain structured viscosity.

The non-structured viscosity provides another unique benefit in that the carrying capacity will vary in the agitation is reduced in a separating tank the carrying capacity will drop off and the cuttings and the like from the wellbore will fall out of the fluid, yet when agitated there is ample carrying capacity to carry the cuttings and the like to the surface from the wellbore.

Unfortunately, the noted instability of these materials in boreholes and have made them unsuited as viscosifiers and relegated them to the task of a water loss additive in clay-based fluids.

It is an advantage of the present additive compostion that it has extended stability and effectiveness over a higher temperature range. A particular feature is that faster yields are obtained by using the additive composition in wellbore fluids. A particular advantage of the present additive composition is that the water loss effectiveness is greater and is extended beyond that achieved with unstabilized hydroxy-alkylated guar gum. These and other advantages and features of the present invention will be apparent from, the disclosure, descriptions and teachings set out below.

SUMMARY OF THE INVENTION

Briefly stated the present invention is an additive composition for use in clay-free, non argillaceous, wellbore fluids comprising hydroxyalkyl guar gum and a stabilizing amount of magnesia or magnesium hydroxide and the wellbore fluids containing said additive composition. The additive composition comprises hydroxyalkyl guar gum and at least 10 weight percent magnesia or magnesium hydroxide based on the weight of hydroxyalkyl guar gum. Preferably the composition will contain about 28 to 50 weight percent magnesia or magnesium hydroxide based on the weight of hydroxyalkyl guar gum.

DETAILED DESCRIPTION OF THE INVENTION AND PREFERRED EMBODIMENTS

Guar gum is a natural vegetable colloid commercially produced in the form of a powder. Commercial guar gum is a component of the legumenous seed Cyamopsis tetragonaloba. The gum occurs in the endosperm of these seeds where its natural function is to reserve food supply for the developing plant. Guar gum is a polysaccharide consisting of a complex carbohydrate polymer of galactose and mannose and is chemically classified as a galactemannan.

Natural guar gum has a number of hydroxyls which readily react with alkylene oxides such as ethylene oxide, proplyene oxide or butylene oxide. In addition reactive alkylene oxides include the homologs of these compounds represented by the general formulas:

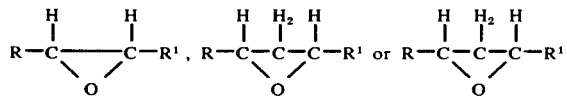

where R is a lkyl radical has 1 to 6 carbon atoms and $R^1$ is hydrogen or a alkyl radical having 1 to 6 carbon atoms. The homologous oxides react with the hydroxyl of the guar gum to produce hydroxy ethers with the hydroxyl group not terminally situated, for example 1,2- epoxy butane produces β-hyrdoxy butyl guar gum whereas ethylene oxide, propylene oxide or butylene oxide produce hydroxy alkylated ethers with the hydroxy alkylated ethers with the hydroxyl on the terminal carbon of the alkylated chain, e.g. 1,4-epoxy butane reacts with guar gum to produce 4-hydroxy butyl guar gum.

In addition the two, three and four membered rings, higher-membered rings may be used to synthesize the hydroxy alkylated guar gum, however such higher membered ring are less chemical reactive, hence the practical likelihood of the economic preparation of this type of hydroxy alkylated guar gum is remote. The two and three membered rings are the most reactive and offer the likelihood of producing hydroxy alkylated guar gum on an economic level that may be used realistically as a wellbore fluid additive.

Both hydroxy ethylated and hydroxy propylated guar gum are currently commercially available at costs competitive with other non-thixotropic wellbore fluid viscosifiers, particularly if the excellent yield and filtrate properties are considered.

A preferred group of hydroxy guar gum ethers are hydroxy-ethyl guar gum, 3-hydroxy propyl guar gum, 4-hydroxybutyl guar gum, 2-hydroxy butyl guar gum, 2-hydroxy propyl guar gum, and 3-hydroxy butyl guar gum.

Magnesia is a highly infusible magnesium oxide (MgO), prepared by the calcination of magnesium carbonate, ($MgCO_3$). Magnesia is only slightly soluble in water, e.g., 0.0086 grams/100 cc (86ppm) of water at 30° C. and is essentially non-hydratable. One theory for the effectiveness of the present invention is that the very slightly soluble magnesia which is present in excess of its solubility in the wellbore fluid provides a reservoir of basicity of just the correct amount to maintain the pH of the fluid in the range at which the hydroxalkylated guar gum is most stable. Magnesium hydroxide may be similarly viewed. This theory is proposed as a possible explanation for the operation of the present invention and is not intended to limit the scope of the invention.

The slight solubility of magnesia and magnesium hydroxide in wellbore fluids results in a very low magnesium ion concentration, that is, for example MgO has less than 0.001% or 10 ppm of magnesium ion concentration or dissolved magnesium, yet the pH remains strongly alkaline when employed in stabilizing amounts. The amount of magnesia or magnesium hydroxide in the composition may be greater than 50 weight percent without detriment to the operation of the composition in the wellbore fluid, e.g., several hundred times the specified minimum amount may be added with no ill effect on the viscosifer (hydroxyalkyl guar gum) or the drilling fluid.

The amount of the composition employed in the wellbore fluid is not critical and may vary for different applications of the fluid. Generally at least 0.5 pound up to about 5 to 10 pounds of hydroxyalkyl guar gum per U.S. barrel (42 U.S. gallons) will be employed. Hence, as stated above there will be at least 0.05 ppb of magnesia or magnesium hydroxide present in the wellbore fluid. This minimum amount of magnesia and magnesium hydroxide represents an excess of magnesia beyon that soluble in the wellbore fluid e.g., greater than 0.0035 pounds of magnesia per barrel of water.

In addition to the hydroxyalkyl guar gum and magnesia or magnesium hydroxide other conventional wellbore additives can be present, serving their usual functions. For example, the alkali and alkaline earth lignosulfonate salts such as calcium lignosculfonate, sodium lignosulfonates serving as water loss additives, starches, gums, and oil also serving as water loss additives, density modifying material such as calcium chloride, sodium chloride and zinc chloride. In other words, any of the known additive materials may be added so long as the basic characteristics of the non-clay wellbore fluid are not changed.

It has been found that the pH of the drilling fluid after combining it with the additive composition of the present invention should be highly alkaline, i.e., preferably about 8.5 or more preferably 8.5 to about 11 to obtain yield.

The wellbore fluid will contain a substantial amount of water, i.e., it is an aqueous based fluid. Oil may be present to form water-oil wellbore fluids with appropriate emulsifiers as known in the art. The present additive composition and amounts in the wellbore fluid, however, relates only to the aqueous portion.

EXAMPLE 1-14

In these Examples the components were added to a brine solution of NaCl. The additives, other than hydroxpropylated guar gum (HPG) were added to the brine first followed by the HPG. The samples were dynamically aged for 16 hours at 175° F, cooled to room temperature (75° F), stirred 5 minutes and tested.

The compositions, tests and results are set out in Table I. The quantities listed below are in pounds per barrel (ppb) or pounds per gallon (ppg).

EXAMPLES 15 and 16

In these runs the additives were added to 1 barel (42 U.S. gallons) of tap water. The additives other than hydroxyalkylated guar gum (if any) were first added to the water followed by the addition of hydroxyalkylted guar gum. The aqueous mixture was stirred at slow speed for 5 minutes and the test run for initial viscosity and pH properties and after standing overnight at 67° F for which the results are reported in Table II. A second set of runs on the same compositions was made after aging 1 hour at 67° F for viscosity, pH and fluid loss (API) also reported in Table II. A third set of runs was carried out after an additional 1 pound per barrel hydroxy-propyl guar gum was added to each of the fluids. Viscosity determinations were also made according to API standards, using a direct indicating viscometer, specifically a Fann V-6 meter. The pH was determined with a Beckman glass electrode pH meter.

Table I

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 9.1 ppg NaCl Brine, bbl | 1 | 1 | 1 | 1 | 1 | 1 | 1 | 1 | 1 | 1 | 1 | 1 | 1 | 1 |
| HPG, ppb | 1.75 | 1.75 | 1.75 | 1.75 | 1.75 | 1.75 | 1.75 | 1.75 | 1.75 | 1.75 | 1.75 | 1.75 | 1.75 | 1.75 |
| MgO, ppb | | | | .01 | .05 | .1 | .2 | .6 | 1.0 | 2.0 | 5.0 | | | |
| Mg(OH)$_2$, ppb | | | | | | | | | | | | .2 | .6 | 1.0 |
| 10% HCl, cc | 1.0 | | | | | | | | | | | | | |
| Apparent Viscosity,cp | 20.8 | 22 | 20.3 | 20.3 | 21.5 | 23 | 21 | 22 | 22.5 | 23¼ | 24.5 | 20 | 21 | 21 |
| Plastic Viscosity,cp | 22 | 13 | 12 | 12.5 | 12 | 14 | 12 | 13 | 12 | 13.5 | 13.5 | 12 | 12 | 12 |
| Yield Point, No./100 sq.ft. | 7.5 | 18 | 16.5 | 16.5 | 19.0 | 18 | 18 | 18 | 21 | 19.5 | 22 | 16 | 18 | 18 |
| Gels, Initial/10 min. | 3/3 | 3/3 | 3/3 | 3/3 | 4/4 | 4/4 | 4/4 | 4/4 | 4/4 | 4/4 | 4/4 | 3/3 | 3/3 | 3/4 |
| pH | 6.9 | 8.2 | 7.6 | 8.5 | 9.4 | 9.8 | 9.9 | 9.95 | 10.0 | 10.1 | 10.3 | 8.9 | 9.4 | 9.4 |
| API Fluid Loss, cc | 250+ | 258+ | 327 | 315+ | 326 | 311 | 253 | 159 | 130 | 178 | 90.8 | 321+ | 285 | 208 |

One embodiment of the present invention is a wellbore fluid consisting essentially of water and an electrolyte inhibitor for preventing hydration, selected from the group consisting of at least 600 ppm calcium ion, at least 200 ppm aluminum ion or chromium ion, at least 1,500 ppm potassium chloride, at least 5000 ppm sodium chloride and combinations thereof.

Brines provide a preferred wellbore fluid of the present invention, generally containing at least 1.0% by weight of a soluble salt of potassium, sodium or calcium in water. In addition, the brine may contain other soluble salts, for example, zinc, chromium, iron, copper and the like. Generally, the chlorides are employed because of availability, but other salts such as the bromides, sulfates and the like may be used. The soluble salts of the brine, not only furnish the weighting material by adjusting the density of the solution, but also typically furnish the cations for inhibiting the fluid against hydration of solid materials.

TABLE II

| EXAMPLE | 15 | 16 |
|---|---|---|
| Composition (pounds per bbl) | | |
| Mg(OH)$_2$ (NF* grade) | | |
| MgO pbb | 1 | 1 |
| CaLig* ppb | | 3 |
| Hydroxypropyl guar gum, ppb | 1 | 1 |
| Initial yield properties after 5 minutes stirring | | |
| 600 Fann | 8 | 17½ |
| 300 Fann | 4½ | 11½ |
| PV*,cp | 3½ | 6½ |
| YP*,lb/100 ft$^2$ | 1 | 5½ |
| pH | 10.5 | 10.15 |
| Properties after overnight aging, 5 minutes stirring | | |
| 600 Fann | 20 | 19½ |
| 300 Fann | 13 | 13 |
| PV*,cp | 7 | 6½ |
| Yp*,lb/100 ft$^2$ | 6 | 6½ |
| pH | 10.35 | 10.35 |
| Properties after stirred 5 minutes, aged 1 hour 67° F. | | |
| 600 Fann | 41½ | 45½ |
| 300 Fann | 29½ | 34 |
| PV*cp | 12 | 11½ |
| YP* lb/100 ft$^2$ | 17½ | 22½ |

TABLE II-continued

| EXAMPLE | 15 | 16 |
|---|---|---|
| pH | 10.35 | 10.3 |
| API Filtrate ml | 22.1 | 61.9 |

¹CaLig-calcium lignosulfonate marketed by St. Regis Pulp & Paper Co. as Toranil
3, PV-plastic viscosity, YP-yield point, cp-centipoise, NF-National Formulary Wellbore test fluids containing MgO and hydroxy propyl guar gum showed upto 96% protection against corrosion from dissolved $O_2$.

EXAMPLES 17-21

These compositions and tests were done in the same manner as those of Examples 1-14. The results are set out in Table III.

TABLE III

| Example No. | 17 | 18 | 19 | 20 | 21 |
|---|---|---|---|---|---|
| Brine, 1 bbl | 9.1 ppg NaCl | 9.1 ppg NaCl | 9.1 ppg NaCl | 9.1 ppg NaCl | 9.1 ppg NaCl |
| HPG, ppb | 2 | 2 | 2 | 2 | 2 |
| Calcium LignoSulfonate, ppb | | 2 | 2 | | |
| Magnesium Oxide, ppb | | | 0.6 | 0.6 | |
| Magnesium Hydroxide, ppb | | | | | 0.6 |
| TEST DATA: | | | | | |
| Apparent Viscosity,cp | 25 | 11 | 22.5 | 26.5 | 25.1 |
| Plastic Viscosity, cp | 13 | 9 | 13 | 14 | 13.5 |
| Yield Point, No./100 sq. ft. | 24 | 4 | 19 | 25 | 24 |
| Gels, Initial/10 Min. | 4/4 | 3/3 | 4/4 | 5/5 | 4/4 |
| pH | 7.8 | 6.7 | 9.8 | 9.9 | 9.3 |
| API Fluid Loss, cc | 323 | 67 | 39.8 | 180 | 249 |

The invention claimed is:

1. A wellbore fluid additive viscosifying composition having improved viscosity stability in wellbore fluids for use in clay-free non-argillaceous aqueous brine fluids which contain at least 1.0% by weight of a soluble salt of potassium sodium or calcium consisting essentially of hydroxyalkyl guar gum selected from the group consisting of hydroxyl ethyl guar gum, hydroxy propyl guar gum and hydroxy butyl guar gum and at least about 10 weight percent of magnesia or magnesium hydroxide based on hydroxy alkyl guar gum.

2. The composition according to claim 1 wherein magnesia is present.

3. The composition according to claim 1 wherein magnesium hydroxide is present.

4. The composition according to claim 1 wherein from about 28 to 50 weight percent magnesia or magnesium hydroxide is present.

5. A wellbore fluid additive viscosifying composition according to claim 1 containing hydroxy ethyl guar gum.

6. A wellbore fluid additive viscosifying composition according to claim 1 containing hydroxy propyl guar gum.

7. A wellbore fluid additive viscosifying composition according to claim 1 containing hydroxy butyl guar gum.

8. A clay-free, non-argillaceous wellbore fluid having improved viscosity stability comprising water, at least 1.0% by weight of a soluble salt of potassium, sodium or calcium, a viscosifying amount of 0.5 to 5 pounds of hydroxyalkyl guar gum selected from the group consisting of hydroxy ethyl guar gum, hydroxy propyl guar gum and hydroxy butyl guar gum per barrel of water and at least 10 weight percent of magnesia or magnesium hydroxide based on hydroxyalkyl guar gum.

9. The wellbore fluid according to claim 8 containing a lignosulfonate salt fluid loss reducing additive.

10. A wellbore fluid according to claim 8 containing hydroxy ethyl guar gum.

11. A wellbore fluid according to claim 8 containing hydroxy propyl guar gum.

12. A wellbore fluid according to claim 8 containing hydroxy butyl guar gum.

13. The wellbore fluid according to claim 8 wherein from about 28 to 50 weight percent magnesia or magnesium hydroxide is present.

14. The wellbore fluid according to claim 13 wherein magnesia is present.

15. The wellbore fluid according to claim 13 wherein magnesium hydroxide is present.

* * * * *

UNITED STATES PATENT OFFICE
CERTIFICATE OF CORRECTION

PATENT NO. : 4,025,443
DATED : May 24, 1977
INVENTOR(S) : Jack M. Jackson

It is certified that error appears in the above-identified patent and that said Letters Patent are hereby corrected as shown below:

Column 1, line 2 reads "weels" but should read -- wells --

Column 1, line 16 reads "wellfore" but should read -- wellbore --

Column 1, line 49 reads "bine" but should read -- brine --

Column 2, line 68 reads "again a higher" but should read -- again when a higher --

Column 3, line 5 reads "wellboae" but should read -- wellbore --

Column 4, lines 1-5, formula on the right, reads $$R-\overset{H}{\underset{}{C}}-\overset{H_2}{\underset{\diagdown}{C}}-\overset{H}{\underset{\diagup}{C}}-R^1$$
$$O$$

but should read --

$$R-\overset{H}{\underset{}{C}}-\overset{H_2}{\underset{}{C}}-\overset{H_2}{\underset{\diagdown}{C}}-\overset{H}{\underset{\diagup}{C}}-R^1$$
$$O$$

--

UNITED STATES PATENT OFFICE
CERTIFICATE OF CORRECTION

PATENT NO. : 4,025,443

DATED : May 24, 1977

INVENTOR(S) : Jack M. Jackson

It is certified that error appears in the above-identified patent and that said Letters Patent are hereby corrected as shown below:

Column 3, line 17 reads "vary in the" but should read -- vary. As the --

Column 4, line 6 reads "R is a lkyl radical has" but should read -- R is an alkyl radical having --

Column 4, line 56 reads ".001% or 10 ppm" but should read -- .01% or 100 ppm --

Column 5, line 7 reads "beyon" but should read -- beyond --

Column 5, line 8 reads ".0035 pounds" but should read -- .035 pounds --

Column 5, line 13 reads "calcium lignosculfonate" but should read -- calcium lignosulfonate --

Column 6, line 15 reads "barel" but should read -- barrel --

Signed and Sealed this

First Day of April 1980

[SEAL]

Attest:

SIDNEY A. DIAMOND

Attesting Officer

Commissioner of Patents and Trademarks